United States Patent [19]

Moore et al.

[11] 4,074,741

[45] Feb. 21, 1978

[54] ANTI-SKID TIRE CHAIN

[76] Inventors: Clifton Ross Moore; John Greydon Moore, both of Suite 215 Duke Towers, Halifax, Nova Scotia, Canada

[21] Appl. No.: 579,611

[22] Filed: July 15, 1975

[51] Int. Cl.$^2$ ............................................. B60C 27/02
[52] U.S. Cl. ........................................ 152/237; 24/25; 403/341
[58] Field of Search ................................ 152/232–238; 24/25, 22, 26, 206 R, 206 A; 403/393, 341

[56] References Cited

U.S. PATENT DOCUMENTS

| 709,400 | 9/1902 | Fitzpatrick | 403/341 |
|---|---|---|---|
| 1,292,529 | 1/1919 | Stephany | 152/238 |
| 2,107,517 | 2/1938 | Bishop | 152/237 X |
| 3,078,532 | 2/1963 | Bywater | 24/22 |

Primary Examiner—Robert B. Reeves
Assistant Examiner—Francis J. Bartuska Attorney, Agent, or Firm—Shlesinger, Arkwright, Garvey and Dinsmore

[57] ABSTRACT

Anti-skid tire chains for automobiles are known to be consisted of a various number of cross strands of steel or plastic link chains which have been fitted together into a harness or halter type of arrangement, and which is affixed to an automobile tire by means of some type of fastener mechanism which has been engineered (in peculiarity) to a given make of tire chain. In this invention, only one strand of steel or plastic link chain is constituted in every complete unit. Independent strips of flexible moulded plastic, having serrations molded onto one of the surfaces of each, are fitted to each end of the chain, and in their function thereof comprise a graduated fastener. A further independent piece of hard plastic, moulded in a 'C'-clasp type configuration, serves to lock the fastener parts together. The invention is affixed to the tire through a wheel fello, and when installed, the whole has assumed the shape of a loop enclosing the 'tubularity' of the tire.

9 Claims, 17 Drawing Figures

ANTI-SKID TIRE CHAIN (1) This invention relates to anti-skid tire chains for motor vehicles.

(2) It is common for anti-skid tire chains to consist of a number of cross strands of medium weight twisted link steel chain, or plastic pads covered with stubby cleat-like protuberances, or the like, all of which are fitted together into a harness or halter arrangement which when draped over an automobile wheel, allows those members to become fitted to the outer surface of the tire in the manner of a hair net. These kinds of apparatuses are stabilized against the tire means of various fasteners or fastening devices particular to each manufacturer, and which usually require manual manipulation at locations on both sides of the wheel to install. Thus the installer for a moment must assume one or more inconvenient postures, such as lying on their back. The installation procedure often also requires (or is aided by) such additional equipment as a jack, hoist, screw driver, pliers, or similar tools. And because such harnesses of chain are usually complex, their installation can be counted upon to be an arduous and time consuming process, even for the manually adept.

Also, because of the number of component members of these types of apparatus, they are generally costly in the marketplace and therefore are of the catagory of re-useable item.

By nature of their principle, the cross strands of chain in such apparatuses occur at momentary positions, between both the bottom surface of the tire and travelling surface during the course of a complete revolution of the tire. Therefore in cases where the weight and size of chain link is of common tire chain 'variety,' or, as in the plastic cleat equivalent, these objects at those momentary points under the wheel cause a conciderable vibration to be imparted back upon the automobile parts. This creates a noise and jarring discomfort effecting the user. Also the maximum reasonable speed of the vehicle may be inhibited.

This problem is further increased by virtue of the fact that most of the commonly available models of tire chains are of a universal variety, that is, any one particular given size of chain-set is expected to fit over a variety of tire sizes and models having different tread configurations, air pressures, and like variables. Therefore, no one particular tire chain set will fit perfectly and tightly over any one particular tire, except by coincidence. Therefore the cross strand members hang loosely against the tire perifery, thus both increasing the discomfort of noise, and greatly reducing the desirable anti-skid characteristic due to spinning, twisting, and otherwise dislocations of the member parts from an ideal configuration at the point under the tire where they should be the most stably centered to provide maximum friction against the travelling surface. Furthermore due to these factors, the resultant grinding and wearing of the said members is greatly increased, as well as additional shocks and pressures which are placed upon other member parts of the harness.

The common wire weight and size of link used by most manufacturers, particularly if the chain is of the twisted steel link variety, are such that the surface area of the material presented to both the surface area of the tire, and travelling surface, is of a size as to prevent the pieces from pressing significantly into the tire material as it runs over the pieces. Thus an opportunity is lost for the pieces to be momentarily stabilized by becoming temporarily embossed in the rubber; which would in otherwise fact help reduce much of those aforementioned misalignments producing loss of performance at those instants. Furthermore, these surface areas are too great to allow the pieces to become butted against tiny irregularities in the travelling surface, or to bite into the surface of ice or similar mediums. Thus an even further opportunity to improve both the anti-skid characteristic and the longevity of the parts is lost. The problem is particularly acute in the case of plastic pads of cleats, where in fact some manufacturers advise that the said tire chains are ineffective against glare-ice or similar dangers.

Finally, because of the common weight and size of typical tire chain substances, it is possible for damage to be caused unto the body parts of the automobile upon the occasion of breakage or extreme wear of the tire chain members.

(3) We have found that all these disadvantages may be overcome by constituting the anti-skid tire chain out of one small piece of lightweight, but durable, steel or plastic chain, coupled with flexible lightweight elongated moulded plastic end pieces having uniform serrations inscribed crosswise along one of the lengthwise surfaces of each, and which their joint action function as the fastener; combined with a small 'C'-type clasp which is used to lock the two end pieces together with the serrations interlocked once the apparatus has been affixed onto a tire in an optimum location. We have further found a smaller version of link chain to be superior to larger versions, in both the matter of anti-skid characteristic and resistance to wear, and we attribute this mainly to the ability of the smaller link version to both indent against the tire surface when directly underneath, and to lodge against small irregularities in the travelling surface; where both actions occur concurrently to help counteract the composite negative forces plying in that instant to challenge the net anti-skid capability of the unit.

Another advantage of the independant strands approach to the anti-skid tire chain problem, is that as many as from one, to any, independant strands of chain may be affixed as required, according to the degree of need. We have found that from one to four such independant units, placed at the same time at regular intervals around a given tire, are generally as effective in producing an acceptable amount of anti-skid protection under typical circumstances, as traditional tire chain harnesses having as many as 12 cross-strands all fitted simultaneously against a particular tire. Therefore, both the discomfort of noise and jar, and inhibition against speed, can be noticeably reduced.

The invention may be effortlessly affixed to a tire by passing one of the elongated end pieces through a wheel fello, with chain and second end piece following; then drawing the first around the cross periphery of the tire to meet the second as to form a loop completely enclosing the tire 'tube.' The second end piece is then laid atop the first, so that the serrations on the surface of each engage in a manner which allows the two end pieces to be further slide along each other (end to end) in a direction which causes the diameter of the loop to be reduced, but not in a direction which would allow the diameter to become enlarged. The two end pieces are thus slid along their serrated surfaces until the loop forms a tightest possible enclosure of the tire. The aforementioned matched engagement of the serrations prevents the loop from relaxing from that configuration. A 'C'-type memory-enforced plastic clasp is then lowered over the two interlocked end pieces, via the opening existing between the flanges of the 'C', and is snapped into place over the end pieces to lock them together as they sit.

Because it is possible to manufacture the spacings between the individual serrations on the matched end pieces to be very small, the suggested recourse to such serrations can offer all of the requisites of a very uniformly graduated universal fastener. Therefore this invention will fit equally snug to any common tire within a prescribed tire size range. And thus is effected, a conciderable relative improvement in both anti-skid characteristic and resistence to wear.

The invention may be easily removed (if required) by merely spreading apart the 'C'-type clasp at the flanges to overcome the memory of the plastic, lifting it off the interlocked end pieces, lifting the top lying end piece off from the other, and pulling the remainder of chain and end piece following, out of the fello. Thus the invention can be quickly and effortlessly affixed, or removed, from a tire without recourse to further tools, instruments, awkward postures, or particular manual dexterity.

We have found the invention to be manufacturable by traditional techniques. The serrated strip parts, and 'C'-clasp, are all ideally suited to mass production by normal methods of injection moulding of plastics or similar substance. The link chain can be made on any typical forming apparatus, requiring only a particular mould. Case hardening of the steel is accomplished by standard processes which are available in many founderies.

Should it be deemed useful to produce the link chain in hard plastic or similar substance, this again is possible through uncomplicated technical procedures of injection moulding. Softer nylon varieties of link chain are already on the market.

In final mention, we have found the invention to be manufacturable and distributable to the user at a user cost which is consonant with the concept of disposable. The basic intention of the invention is that they be affixed where and when required, and driven upon until exhausted. Having the user assemble the parts via the couplings, merely serves to reduce the overall cost per unit to the user in vogue with the concept of disposable product.

(4) In the drawings, the invention is illustrated in one embodiment.

Figure 1:
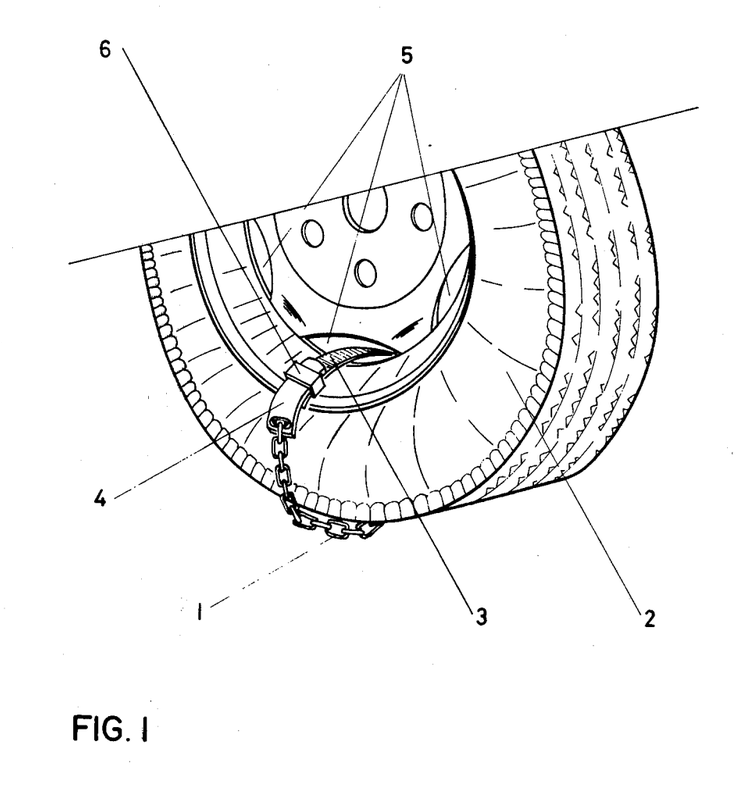
FIG. 1 is a partial view in perspective of an embodiment of the invention.

In FIG. 1, a length of link chain 1, is wrapped around a tire 2, and is coupled at one end to a long serrated flexible strip of moulded plastic 3, and to a shorter strip 4 at the other end. The whole is fitted to the tire by passing through one of the wheel fellos 5. A ridged plastic moulded 'C'-clasp 6, is clamped over the two serrated strips where they sit, in the position shown relative to the tire or comparable position. The longer strip 3 lays under the shorter strip 4 when related to a tire surface, as shown in the embodiment illustrated in FIG. 1.

Figure 2:
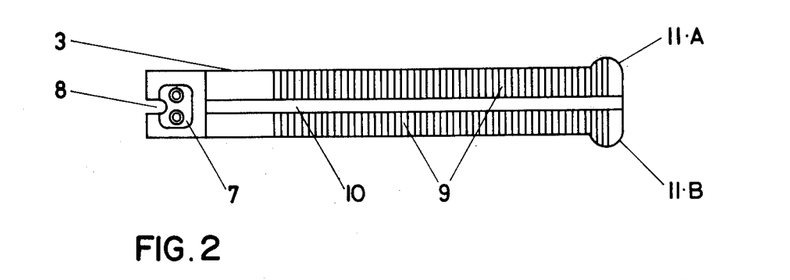
FIG. 2 is a top view, in which details of one of the ingredient parts of the embodiment illustrated in FIG. 1 are shown.
Figure 3:
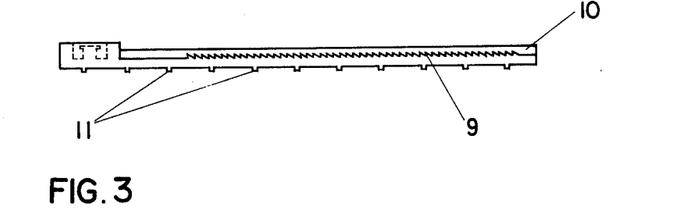
FIG. 3 is a side view, further detailing aspects of the same part illustrated in FIG. 2.
Figure 4:
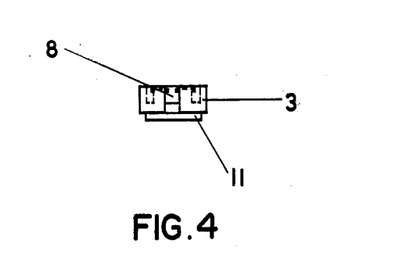
FIG. 4 is a right end view further detailing aspects of the same part illustrated in FIG. 2, and FIG. 3.
Figure 5:
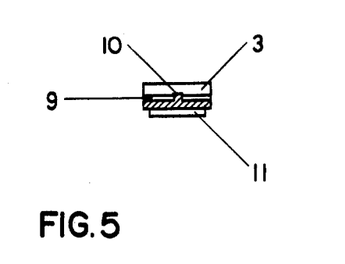
FIG. 5 is a left end view, further detailing aspects of the same part illustrated in FIGS. 2, 3, and 4.
Figure 6:
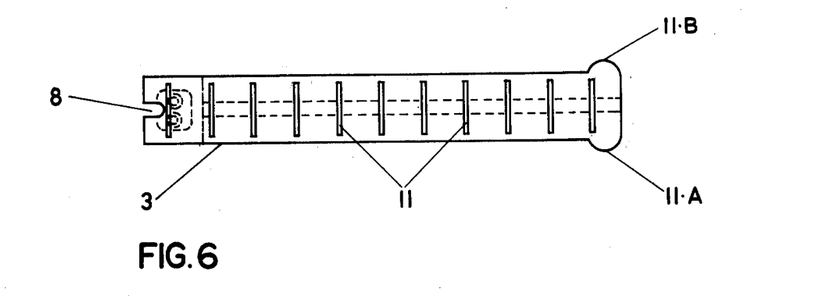
FIG. 6 is a bottom view, further detailing aspects of the same part illustrated in FIGS. 2, 3, and 4.
Figure 7:
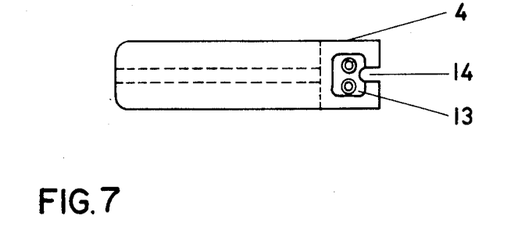
FIG. 7 is a top view, detailing aspects of another ingredient part of the embodiment illustrated in FIG. 1.
Figure 8:
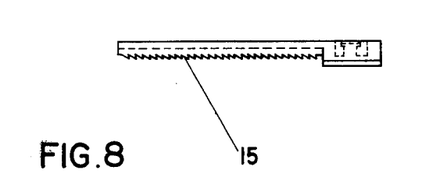
FIG. 8 is a side view, further detailing aspects of the same part illustrated in FIG. 7.
Figure 9:
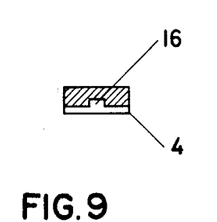
FIG. 9 is a left view further detailing aspects of the same part illustrated in FIG. 7 and FIG. 8.
Figure 10:
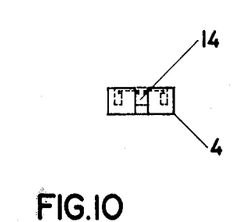
FIG. 10 is a right end view, further detailing aspects of the same part illustrated in FIGS. 7, 8, and 9.
Figure 11:
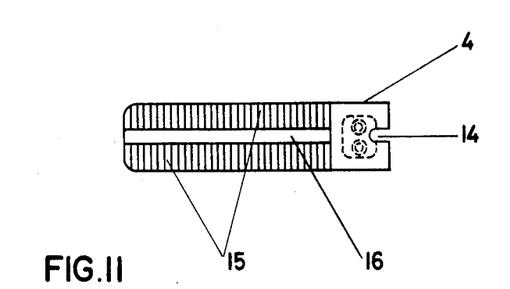
FIG. 11 is a bottom view, further detailing aspects of the same part illustrated in FIGS. 7, 8, 9, and 10.

FIGS. 2, 3, 4, 5, and 6, collectively, are various views of the longer strip 3 illustrated in FIG. 1, which allows its features to be seen. A cavity 7 and slot 8, shown mainly in FIG. 2, exists at one end of the strip, and is where the chain piece 1, affixed to strip 3 is manually fitted thereupon. A series of parallel serrations or teeth 9, illustrated mainly in FIG. 2, are inscribed cross-wise at regular small intervals along a portion of the top surface of the strip. A tongue 10, illustrated mainly in FIG. 2, is moulded lengthwise up the centerline of the top of the strip, and is at right angles to each individual serration. A series of ridges 11, illustrated mainly in FIGS. 3 and 6, are moulded, also cross-wise, at wider regular intervals along the full extent of the bottom of the strip. Enlargements 11(a) and 11(b), illustrated only in FIG. 2 and FIG. 6, occur at the opposite end of the strip from the cavity slot, and are used to hold steady the piece against the tire and wheel surface while the whole anti-skid unit is being affixed thereon.

FIGS. 7, 8, 9, 10, and 11, collectively, are various views of the shorter strip 4 illustrated in FIG. 1, showing the basic similarities and differences of it to the longer strip 3 illustrated in FIGS. 2 through 6 respectively. The shorter strip 4, lays atop the longer strip 3, when both are positioned in an optimum relation to a tire as shown with the embodiment illustrated in FIG. 1. A cavity 13 and slot 14, shown mainly in FIG. 7, and identical to the cavity 7 and slot 8 of the longer strip 3 illustrated in FIGS. 2 through 6, similarly exists at one end of the shorter strip 4. A segment of parallel serrations 15, matching the serrations 9 on the longer strip 3, and shown mainly in FIG. 8 and FIG. 11, exists along a portion of the bottom of the shorter strip 4. A groove 16, shown mainly in FIG. 9 and FIG. 11, runs lengthwise up the centerline of a portion of the bottom of the shorter strip 4, also at right angles to each serration.

Figure 12:
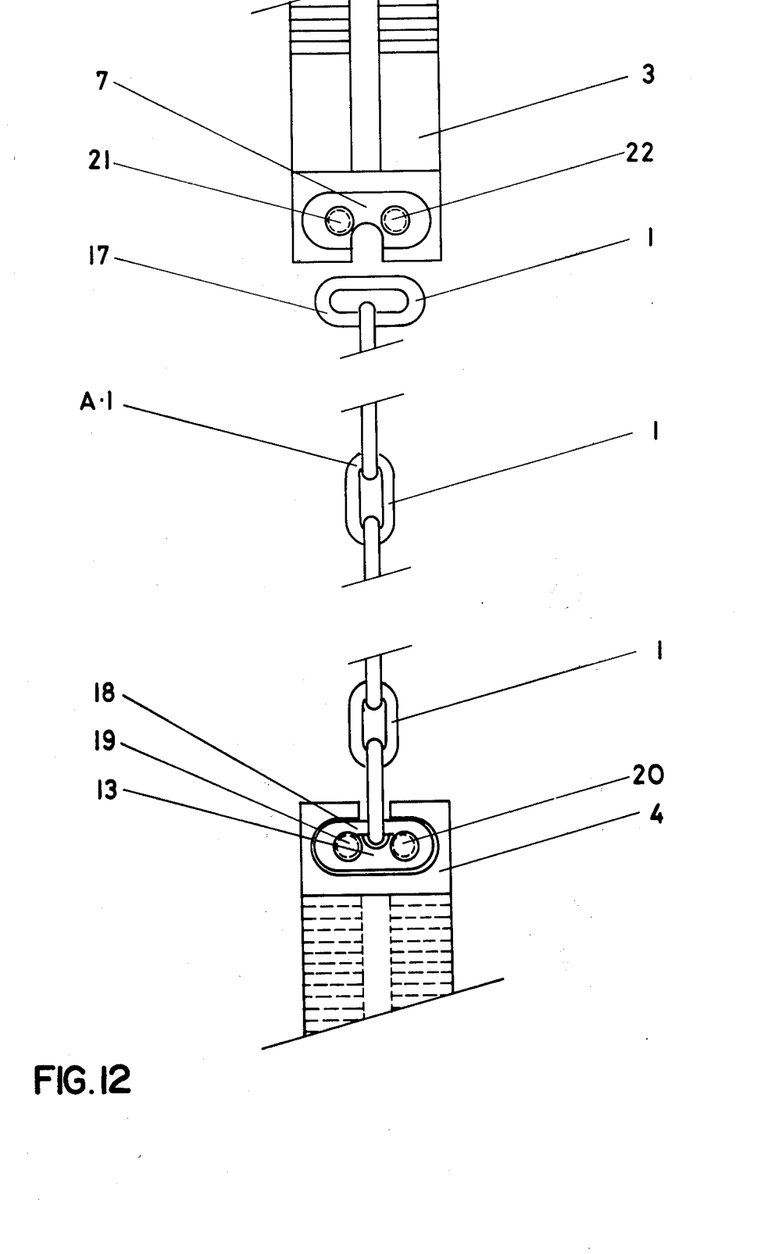
FIG. 12 is a top view in which joint aspects of some of the parts of the embodiment illustrated in FIG. 1 are detailed, and which further clarifies certain individual aspects of the two parts illustrated in FIGS. 2 through 6, and FIGS. 7 through 11, respectively.

FIG. 12 shows a specific alignment of the end-most links, 17 and 18, which are found, one each, at each end of chain 1, and is to imply how the chain is properly matched into the cavity and slot of both the longer strip 3, and shorter strip 4, for fitting thereon. Four identicle pegs 19, 20, 21, and 22, are found, two each, in both of cavities 7 and 13. Each are slightly enlarged at the top, over which the aforementioned links of the aforementioned chain must be slightly forced in order to be seated securely in each cavity. The plastic memory of the enlargements of the pegs constitutes the means by which the said links are prevented from popping back out of the cavities under duress. Specifications for an optimally tested size of link 1A are given, but do not imply neccessity for the part.

Figure 13:
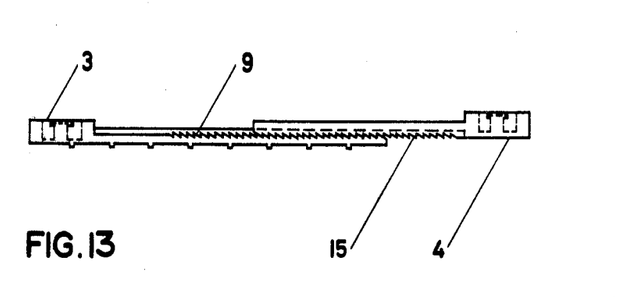
FIG. 13 is a side view, in which is illustrated a specific joint aspect of the two parts detailed in FIGS. 2 through 6, and 7 through 11, respectively.

In FIG. 13 is shown an engagement of the serrations 9 and 15, on the longer strip 3 and the shorter strip 4, respectively, and shows that the two strips cannot slide apart in one direction along their length, but can in the opposite.

Figure 14:
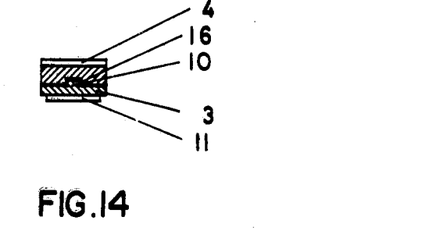
FIG. 14 is a section of the line A—A as shown in FIG. 13, in which is illustrated another specific joint aspect between the same two parts shown in FIG. 13.

FIG. 14 illustrates that when the serrations 9, and 15, are engaged, the tongue 10 of the longer strip 3 fits into the groove 16 of the shorter strip 4, and in their union thereof, prevent the two strips from sliding apart laterally.

Figure 15:
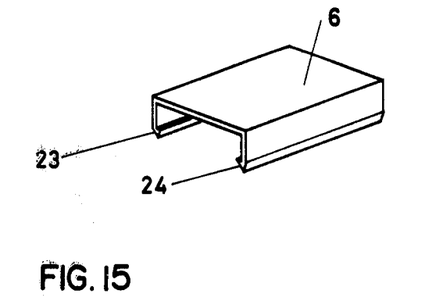
FIG. 15 is a perspective, in which aspects of yet another ingredient part of the embodiment illustrated in FIG. 1 are shown.

FIG. 15 comprises a relief view of the hard plastic moulded 'C'-clasp 6, illustrated at a position in FIG. 1. Identical small ridges 23, and 24, exist along the bottom inner edge of both outer sides of the 'C'-clasp.

Figure 16:
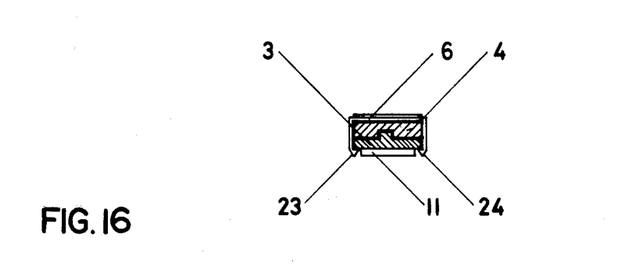
FIG. 16 is a further section of the line A—A as illustrated in FIG. 14, coupled with an end view of the part illustrated in FIG. 15, in which is illustrated yet another specific joint aspect between the same two parts involved in the joint aspect depicted in FIGS. 13 and 14, and the part illustrated in FIG. 15.

In FIG. 16, is illustrated the use of the ridges 23, and 24, of the 'C'-clasp 6 illustrated in FIG. 13, to prevent the longer strip 3 and shorter strip 4 from separating vertically apart. Memory of the hard plastic composition of the 'C'-clasp 6 comprises the only factor keeping the aforementioned outer sides from spreading apart unassisted. Removal of the embodiment illustrated in FIG. 1 from the tire 2, where applicable, is affected by spreading apart the two outer edges of the 'C'-clasp 6; lifting the 'C'-clasp 6 away from the inter-serrated longer and shorter strips 3 and 4; and parting the two said strips to permit pulling the embodiment out of the fello.

Figure 17:
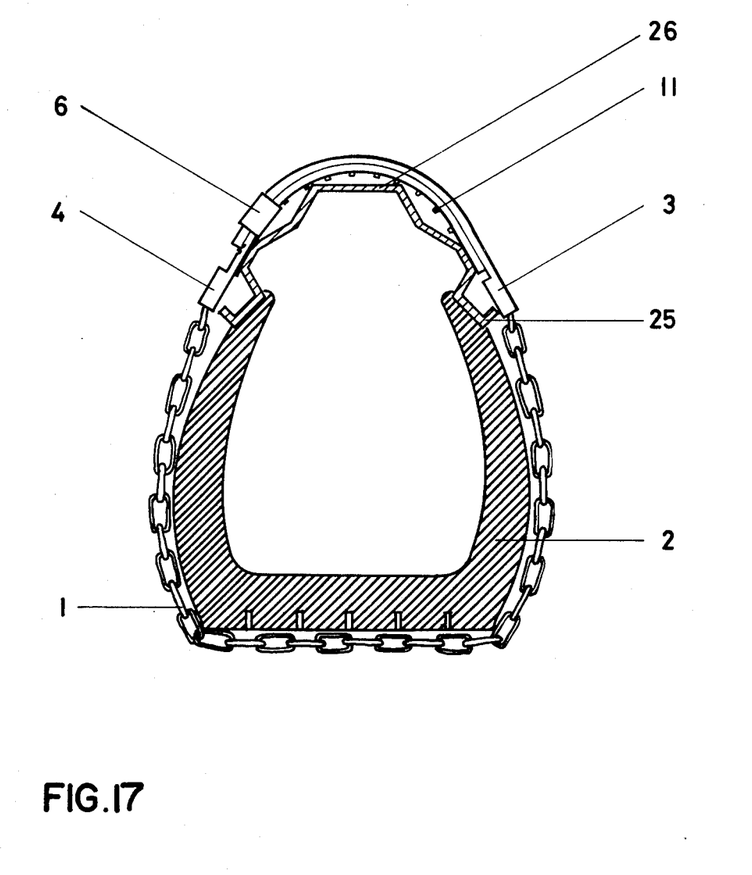
FIG. 17 is a cross section of yet another specific ingredient pertaining to the embodiment illustrated in FIG. 1.

In FIG. 17 is illustrated how the ridges 11, across the bottom of the longer strip 3 illustrated in FIGS. 2 through 6, prevents the embodiment from dislocating away from the orientation to the tire represented in FIG. 1 by lodging against such prominences on the motor vehicle parts as the outer lip of the wheel rim 25, or crown of the fello 26.

The embodiments of the invention in which an exclusive property or privilege is claimed, are defined as follows:

1. An anti skid device adapted to be mounted on a tire and comprising, in combination:
    a single strand of link chain;
    a first strip of flexible material removably connected, at one end thereof, to one end of said link chain;
    a second strip of flexible material removably connected, at one end thereof, to the other end of said link chain;
    said first and second strips being of unequal length;
    said first strip comprising, on a first surface thereof, a first set of serrations and a second set of serrations, said sets extending in the longitudinal direction of said first flexible strip and being separated by first engagement means extending longitudinally along said first surface of said first flexible strip, between said sets of serrations;
    said second strip comprising, on a first surface thereof, a first set of serrations and a second set of serrations, said sets extending in the longitudinal direction of said second flexible strip and being separated by second engagement means extending longitudinally along said first surface of said second flexible strip, between said sets of serrations;
    said second strip being adapted, in operation, to overlie said first strip such that the first surface of the first strip faces the first surface of the second strip;
    whereby the serrations of said first strip interlock with the serrations of said second strip to thereby prevent movement of one strip relative to the other strip in the longitudinal directions of the strips;
    and whereby said first engagement means matingly engages said second engagement means to prevent lateral movement of the strips relative to one another;
    said first strip, in operation, lying adjacent said tire with the second surface thereof facing said tire, said second surface of said first strip comprising ridges extending transversely thereof at regular intervals in the longitudinal direction of said first strip;
    whereby movement of said device along said tire is prevented;
    and clasp means fitting over the interlocked first and second flexible strips whereby to further prevent relative movement between said first and second strips.

2. A device as defined in claim 1 wherein said first strip is of greater length than said second strip.

3. A device as defined in claim 1 and further comprising a first concavity at the other end of said first strip, and a second concavity at the other end of said second strip;
    each of said concavities comprising a cavity having two centering pegs therein;
    whereby the last link at respective ends of the chain can be coupled in their respective cavities by turning the respective last link crosswise to the second last link and matching that configuration into its respective concavity.

4. A device as defined in claim 1 wherein said first engagement means comprises an elongated tongue;
    and wherein said second engagement means comprises a mating elongated groove.

5. A device as defined in claim 1 wherein said clasp means comprises a C-clasp which comprises a one piece three sided lock of rigid plastic;
    and ridge means disposed at the free ends of said C-clasp.

6. A device as defined in claim 1 wherein said first strip comprises a small widening at the other end thereof whereby the first strip may be held manually in place against said tire while said device is being affixed to said tire.

7. A device as defined in claim 1 wherein the links of the chain are 11/32 inch wide on the inside, 1 inch long on the inside, and formed of ⅛ inch wire.

8. A device as defined in claim 1 wherein the serrations all have a uniform slant in one direction similar to racing waves;
 the serrations being relatively disposed on the first surface of the first strip and the first surface of the second strip such that, when the two strips overlie each other in operation, the peaks and valleys of the serrations in the first strip interlockingly engage with the valleys and peaks of the second flexible strip;
 whereby the two strips will be prevented from longitudinal movement relative to one another in the direction in which the two sets of serrations slant into each other.

9. A device as defined in claim 1 wherein said tire is mounted on a wheel comprising at least one fello;
 the device being adapted to be mounted, through a fello, over said tire.

* * * * *